US011953620B2

(12) United States Patent
Amr

(10) Patent No.: US 11,953,620 B2
(45) Date of Patent: Apr. 9, 2024

(54) ARRANGEMENT AND METHOD FOR RUNTIME MEASUREMENT OF A SIGNAL BETWEEN TWO EVENTS

(71) Applicant: HYBRID LIDAR SYSTEMS AG, Bad Salzdetfurth (DE)

(72) Inventor: Eltaher Amr, Braunschweig (DE)

(73) Assignee: HYBRID LIDAR SYSTEMS AG, Bad Salzdetfurth (DE)

( * ) Notice: Subject to any disclaimer, the term of this patent is extended or adjusted under 35 U.S.C. 154(b) by 947 days.

(21) Appl. No.: 16/960,019

(22) PCT Filed: Jan. 3, 2018

(86) PCT No.: PCT/EP2018/050142
§ 371 (c)(1),
(2) Date: Aug. 27, 2020

(87) PCT Pub. No.: WO2019/134745
PCT Pub. Date: Jul. 11, 2019

(65) Prior Publication Data
US 2020/0393565 A1 Dec. 17, 2020

(51) Int. Cl.
G01C 3/08 (2006.01)
G01S 7/48 (2006.01)
G01S 7/4865 (2020.01)
G01S 17/36 (2006.01)
G01S 17/46 (2006.01)
G01S 17/89 (2020.01)

(52) U.S. Cl.
CPC .......... G01S 7/4808 (2013.01); G01S 7/4865 (2013.01); G01S 17/36 (2013.01); G01S 17/46 (2013.01); G01S 17/89 (2013.01)

(58) Field of Classification Search
None
See application file for complete search history.

(56) References Cited

U.S. PATENT DOCUMENTS 5,566,139 A * 10/1996 Abshire ................. G04F 10/06
368/118
6,133,989 A    10/2000 Stettner et al.
(Continued)

FOREIGN PATENT DOCUMENTS

DE    102016107851 A1 * 11/2017 ........... G01S 7/4865
EP    1895322 A1    3/2008
JP    2016183974 A    10/2016

Primary Examiner — Mark Hellner
(74) Attorney, Agent, or Firm — Vivacqua Crane, PLLC

(57) ABSTRACT

Method for a runtime measurement of a signal between two events. A phase shift between the signal on the occurrence of a first event and the signal on the occurrence of a second event is determined, and to an arrangement for performing the method has the underlying object of providing a runtime measurement of a signal between a first event and a second event that can be carried out with a high accuracy, at a high speed, and with a low computational effort. A modulation signal is generated whose phase position is determined as a first signature for the occurrence of the signal in the first event. The phase position of the modulation signal is determined as a second signature for the occurrence of the signal in the second event; and in that the runtime is determined as a difference of the phase positions of the first and second signatures.

10 Claims, 9 Drawing Sheets

(56) References Cited

U.S. PATENT DOCUMENTS

2009/0235127 A1* 9/2009 Ohishi .................. G01S 7/4865
714/E11.023
2010/0277713 A1 11/2010 Mimeault
2016/0161600 A1 6/2016 Eldada et al.

* cited by examiner

ARRANGEMENT AND METHOD FOR RUNTIME MEASUREMENT OF A SIGNAL BETWEEN TWO EVENTS

CROSS REFERENCE TO RELATED APPLICATION

This application is a national stage application under 35 U.S.C. 371 of PCT Application No. PCT/EP2018/050142 having an international filing 3 Jan. 2018, the entire disclosure of which is hereby incorporated herein by reference.

INTRODUCTION

The present invention relates to a method for a runtime measurement of a signal between two events in which a phase shift between the signal on the occurrence of a first event and the signal on the occurrence of the second event is determined.

The invention also relates to an arrangement for a runtime measurement of a signal between two events, said arrangement having a transmission/reception unit that has a transmitter transmitting a pulse of a physical signal in a transfer medium, a sensor receiving a reflection of the pulse, and a computational unit calculating a time difference $\Delta t$ between the pulse and the reflection, the runtime of the physical signal in the transfer medium, and the distance between the transmission/reception unit and a measurement object.

The method and the arrangement can be used for a distance measurement system that is used to implement a three-dimensional (3D) solid-state lidar (lidar: Light detection and ranging) sensor for a (3D) detection of the environment. The proposed solution is suitable for various applications in which a 3D detection of the environment is advantageous. Furthermore, the invention is versatile in use, for example, for the determination of runtimes and latency times in the mobile radio sector.

The prior art for distance measurement will be looked at in the following.

Today, the 3D detection of the environment plays a major role in applications in the sector of the automotive industry (e.g. assisted or autonomous driving), in applications in networked and highly automated environments in the field of Industry 4.0, and in the most varied indoor applications (surveillance, security, navigation, etc.) or so-called smart buildings.

In addition to radio-based sensors with all their advantages and disadvantages, current sensors are based on optical lidar technologies.

Solid-state 3D lidar can be described with respect to the horizontal position in the x-y plane as follows: One or more light sources emit light to an object. The light reflected by the object is received with the aid of a two-dimensional sensor matrix (for example, a photodetector matrix). Each individual photodetector in this sensor matrix is designated as a pixel. The distance from individual objects in the environment of the sensor system can thus be determined by means of one-dimensional 1D distance measurements for each individual pixel in the sensor matrix. As a result, each point in the environment is indicated by its distance from the lidar (z-coordinate, see below) and by the 2D position of the pixel (x-y coordinate).

The 1D distance measurement systems for conventional lidar systems can be divided into two main categories:

a) Direct time of flight (DToF) method

A discrete light pulse is emitted in the direction of an object and one or more timers/clocks are used to measure the time difference between the emitted pulse and the pulse reflected by the object.

Since the speed of light amounts to approximately 300,000,000 m/s, a clock frequency of at least 300 GHz is required to achieve a resolution of 1 mm for the distance measurement. The implementation of such EHF clocks (EHF: extremely high frequency) is a challenge in electronics in the current prior art. Therefore, complex signal processing methods with very high sampling rates are frequently used as an alternative.

The DToF method for distance measurement is rather suitable for larger distances, e.g. 200 m or more.

b) Distance measurement on the basis of the phase shift

In contrast to the DToF method, the intensity of the light transmitted by the light source is modulated with the aid of a periodic continuous HF signal. The phase shift between the emitted signal and the reflected signal ($\Delta\varphi$) is determined. This phase shift $\Delta\varphi$ is directly proportional to the distance of the object. Hardware-based or software-based correlation methods are typically used to determine the phase shift ($\Delta\varphi$). Complex electronic circuits and/or complex signal processing methods are also used here to determine ($\Delta\varphi$).

This method is normally more accurate than the DToF method. However, it is rather suitable for shorter distances, e.g. up to 50 m or 100 m. A further restriction can be seen in that phase shifts greater than one period can no longer be clearly associated with a distance measurement. Therefore, the modulation frequency is one of a plurality of factors that determine the maximum distance from the object.

JP2016183974 (A) relates to a DToF method that uses complex signal processing algorithms to perform a distance measurement for each pixel. The algorithms require accumulative oversampling methods and sophisticated signal processing approaches that in particular require the use of powerful DSPs (digital signal processors) and a plurality of analog-to-digital converters (AD converters) that use very high sampling rates. Furthermore, the achievable accuracy is limited by the sampling rate of the AD converter. The sensor has to be completely replaced to overcome this accuracy limitation.

However, high sampling rates not only increase the costs of the sensor, but also require large storage capacities and computation-intensive signal processing methods, which is in turn reflected in the price of the required processor and in a higher power consumption. This in turn makes it more difficult to configure such sensors as mobile or battery operated.

A distance measurement system that is substantially based on a hardware solution is described in U.S. Pat. No. 6,133,989 (A). Each pixel in the sensor matrix includes a timer that measures the time between the emitted and reflected light pulse. To achieve a high resolution and accuracy, precise time measurement systems are required that have to be implemented with considerable circuitry effort here.

Solid-State 3D lidar sensors are known from US 20160161600 whose distance measurement systems are based on the concept of the optical phased array. The concept uses a plurality of light sources that emit coherent signals with the same intensity. A variable phase regulation is used at each light source to create a far field radiation pattern in the desired direction. The use of a plurality of light sources together with the variable phase regulation increases the costs and the complexity of the sensors. The fact that the radiation pattern generated has a main lobe (ML) and a plurality of side lobes (SL) has to be regarded as problematic. In this respect, the production of a very narrow main lobe is desired, wherein the ML performance should have a high value in comparison with the SL performance to increase the resolution of the system. To achieve this, sophisticated signal processing approaches are required here that in turn increase the complexity of the system and also the consumed power of the sensors.

In summary, it can be stated that the prior art specifies some 3D lidar sensors that are definitely precise; however, they are expensive and complex and furthermore do not have a simple possibility for self-calibration.

SUMMARY

It is therefore an object of the present invention to provide a solution for the runtime measurement of a signal between a first event and a second event that can be carried out with a high accuracy, at a high speed, and with a low computational effort.

It is also the object of the invention to in particular provide a solution for 3D solid-state lidar sensors (3D lidar sensors) that are able to detect both the horizontal position and the distance.

This object is satisfied by a method in accordance with claim 1. The dependent claims 2 to 10 show variants of the method steps.

The object is satisfied by an arrangement in accordance with claim 9. The dependent claims 11 to 16 show advantageous embodiments.

The following definitions are furthermore assumed in the description of the invention.

A physical signal is to be understood as any signal that occurs in various physical forms such as sound signals, light signals, or radio signals.

A transfer medium is to be understood as the medium through which the corresponding physical signal propagates, for example, air or other gaseous media, water or other fluids, or solids.

In this respect, the term reflection should not only be limited to sound reflections or light reflections, for example. Since the invention can generally be used for a runtime measurement, for example in the mobile radio sector, reflection is to be understood as every return of the emitted signal in a processed or unprocessed form. The term reflection is here not only understood as a physical phenomenon, but also as a physical signal.

Runtime is understood as the time that passes from the transmission of the signal until a reflection of this signal arrives at a corresponding receiver.

The format of a digital image of a period duration of the modulation signal of a first and a second value pattern is determined by the number of values in the value pattern and in the time interval or phase distance of the values from one another. In this respect, the time interval or phase distance between the values is expediently but not necessarily the same.

The solution of the method provides that a method of the initially named kind is designed in that a modulation signal is generated whose phase position is determined as a first signature for the occurrence of the signal in the first event; in that the phase position of the modulation signal is determined as a second signature for the occurrence of the signal in the second event; and in that the runtime is determined as the difference of the phase positions of the first and second signatures.

The determination of the difference of the phase positions can in this respect take place digitally, wherein the two signatures are sampled and the thus digital signatures are compared after the point in time of their occurrence in the phase of the modulation signal. However, an analog evaluation is also possible, wherein the phase position of the signatures in the modulation signal is determined instead of the sampling by means of an I/Q demodulation that is known per se.

In a design of the method in which the first event represents a transmission and the second event represents a reception of the signal, provision is made that a pulse of a physical signal is transmitted in a transfer medium by a transmitter of the transmission/reception unit, a reflection of the pulse is received by a sensor of the transmission/reception unit, and the distance between the transmission/reception unit and a measurement object is determined from the time difference $\Delta t$ between the pulse and the reflection and from the runtime of the physical signal in the transfer medium; and in that a modulation signal periodically repeating at a frequency is generated;

in that, during the transmission of the pulse, the modulation signal is sampled at a higher sampling frequency with respect to the frequency of the modulation signal and digital sampled values of the sampling of the modulation signal during the transmission of the pulse are stored as a first value pattern;

in that, during the reception of the reflection, the modulation signal is sampled at the sampling frequency and digital sampled values of the sampling of the modulation signal during the reception of the reflection are stored as a second value pattern; and in that the time difference $\Delta t$ is calculated from a comparison of the occurrence of the second value pattern relative to the first value pattern.

The shift of the value patterns with respect to one another can be determined very easily, e.g. by the coordinates of the memory space in which the value patterns are each stored. If the value pattern of the emitted or transmitted physical signal is, for example, written to a row of a memory organized row-wise and column-wise and the value pattern of the reflection is written to another row of the memory, the runtime can be easily read based on the difference in the column addresses of the mutually corresponding value patterns. The fast computing times and the small memory requirement of the invention make it possible for the runtime measurement of a signal to be cyclically repeated by the transmission of pulses of a pulse sequence, with the pulse sequence frequency $F=1/T$ of the pulse sequence being selected such that its period duration T is greater than a maximum runtime or measurement distance of the transmission/reception unit.

The method can also be implemented in that the reflection of the pulse is detected by a plurality of sensors of a respective pixel of a sensor matrix. In this respect, a single signal is transmitted that then generates a plurality of reflections that are received by the plurality of sensors, wherein, for each sensor, a comparison of the sampled values of the corresponding reflection with the sampled values of the emitted or transmitted signal is carried out as described above.

It is also possible that a plurality of pulses are transmitted and their reflections are received in that in each case, for example in a transmission/reception matrix, a pixel transmits its own pulse and detects the reflection of this pulse.

It is expedient in this respect that each pulse of a pixel is coded by a code of the pixel and only the reflections that have the code matching the pixel are detected.

To reduce or eliminate interference signals, it may be advantageous to store the digital sampled values as a mean value of a plurality of digital sampled values over a plurality of periods of the modulation signal that each correspond to the same sampling point in time of one period of the modulation signal in another period.

In this respect, either the digital sampled values of the modulation signal during the reception of the reflection can be stored as mean values and/or the digital sampled values of the modulation signal during the transmission of the pulse can be stored as mean values.

The comparison of the occurrence of the second value pattern relative to the first value pattern can be implemented by storing a digital image of a period duration of the modulation signal in the format of the first and second value patterns in a look-up table. As already described in the definitions specified above, the format in this respect means that both the digital image and the value patterns each have the same number of values and that the corresponding values also have the same spacing from one another. In this respect, the spacing between the values is expediently equal, which can be achieved by a constant sampling rate of the analog-to-digital converters. In general, however, the spacings in the format can also be different. Since the format applies to the digital image and to the value patterns, the condition that the mutually corresponding spacings are always the same is satisfied.

A first phase position of the first value pattern in the digital image is determined from a comparison of the first value pattern with the digital image and a second phase position of the second value pattern is determined from a comparison of the second value pattern with the digital image. A phase difference is determined from the difference of the first phase position and the second phase position. In this respect, the phase difference can either be determined as an angular difference $\Delta\varphi$ from the different positions with respect to the phase angle $\varphi$ or as a time difference $\Delta t$ from the point in time of the first values of the value patterns.

In an embodiment of the method, provision is made that the look-up table comprises a plurality of stored value patterns of the modulation signal that are stored in accordance with their phase position within the period of the modulation signal. The value patterns of the modulation signal therefore represent comparison values having a reference to a time-specific or angle-specific phase. It is thus possible with the first value pattern and the second value pattern to determine their phase positions if they agree with the phase position of one of the value patterns of the digital image. If such an agreement is namely determined, the phase position of the matching value pattern can be determined from the reference of said matching value pattern.

The digital image can be used as long as the shape of the modulation signal does not change. Thus, the look-up table can be created and stored at the start of the application of the method and can remain unchanged over a plurality of applications of the method. In this respect, the phase position-specific value patterns are either generated by an initial sampling of the modulation signal or by a calculation.

The solution of the arrangement comprises an arrangement of the initially named kind that is characterized by
- a generator generating a periodically repeating modulation signal,
- a first analog-to-digital converter sampling the modulation signal at a sampling frequency synchronous to the modulation signal during the transmission of the pulses,
- a first memory storing digital sampled values of the sampling of the modulation signal during the transmission of the pulse as a first value pattern,
- a second analog-to-digital converter sampling the modulation signal at the sampling frequency during the reception of the reflection,
- a second memory storing digital sampled values of the sampling of the modulation signal during the reception of the reflection as a second value pattern, and
- a computational unit calculating the time difference $\Delta t$ from a comparison of the occurrence of the second value pattern relative to the first value pattern.

The arrangement can also include a sensor matrix that has a plurality of pixels, each having a sensor and/or a transmitter.

To eliminate or reduce the influence of interference variables, it is expedient that the second memory is configured as storing the digital sampled values as a mean value of a plurality of digital sampled values over a plurality of periods of the modulation signal that each correspond to the same sampling point in time in a period of the modulation signal within one period.

For this purpose, a logic circuit can be provided that calculates the digital sampled values of the modulation signal during the reception of the reflection as mean values.

The arrangement in accordance with the invention can be provided with a first comparator that is provided with a threshold value input and with a pulse input detecting the transmitting pulse and the output of said first comparator is connected in a controlling manner to a first analog-to-digital converter.

To detect only the significant portions of a pulse, a first comparator can be provided that is provided with a threshold value input and with a pulse input detecting the transmitting pulse and the output of said first comparator is connected in a controlling manner to a first analog-to-digital converter.

For the same reason, a second comparator can be provided that is provided with a threshold value input and with a pulse input detecting the reflection and the output of said second comparator is connected in a controlling manner to a second analog-to-digital converter.

The runtime measurement method and runtime measurement system in accordance with the invention includes a hybrid between the methods for distance measurement with the aid of the phase shift method and DToF method and uses the advantages of both methods.

The advantage of the functional principle proposed here for the application in a 3D lidar sensor is that simple and innovative software-based methods are used to implement a precise and inexpensive distance measurement system. Thus, an environment can be implemented as a point cloud, i.e. in the form of several thousand points, in a three-dimensional space. This proposed system is suitable for different applications of lidar sensors.

In comparison with the prior art, this is achieved with less computational and circuitry effort. These properties are the key to the flexibility and performance of the new technology.

In addition, the proposed distance measurement system avoids signals in the very high frequency (VHF) range or ultra-high frequency (UHF) range, high sampling rates or oversampling rates, i.e. sampling rates above the Shannon-Nyquist threshold, as well as the consumption of large memory resources.

The proposed 3D lidar sensor allows a self-calibration since correction factors can be specified for different voltage values and temperature values, as well as for other variable boundary conditions of the measurement.

The sensors to be developed will be suitable for various areas of application of 3D lidar sensor technology. The two main target applications are:
(1) Sensor technology for driver assistance systems (DAS) and sensor technology for autonomous vehicles
(2) Indoor smart sensing (ISS). In this respect, this application should not only be restricted to smart homes or connected homes, but should very generally also relate to sensor technology in indoor environments. The goal here is to connect and network different sensors with one another in order to make optimal decisions in certain situations.

BRIEF DESCRIPTION OF THE DRAWINGS

The invention will be explained in more detail in the following with reference to an embodiment. In the associated drawings, there are shown FIG. 1 a schematic diagram of the runtime measurement of a transmitted physical signal and of the creation of reflections at an object as well as their reception by a sensor matrix in accordance with the prior art.

DETAILED DESCRIPTION

Figure 1:
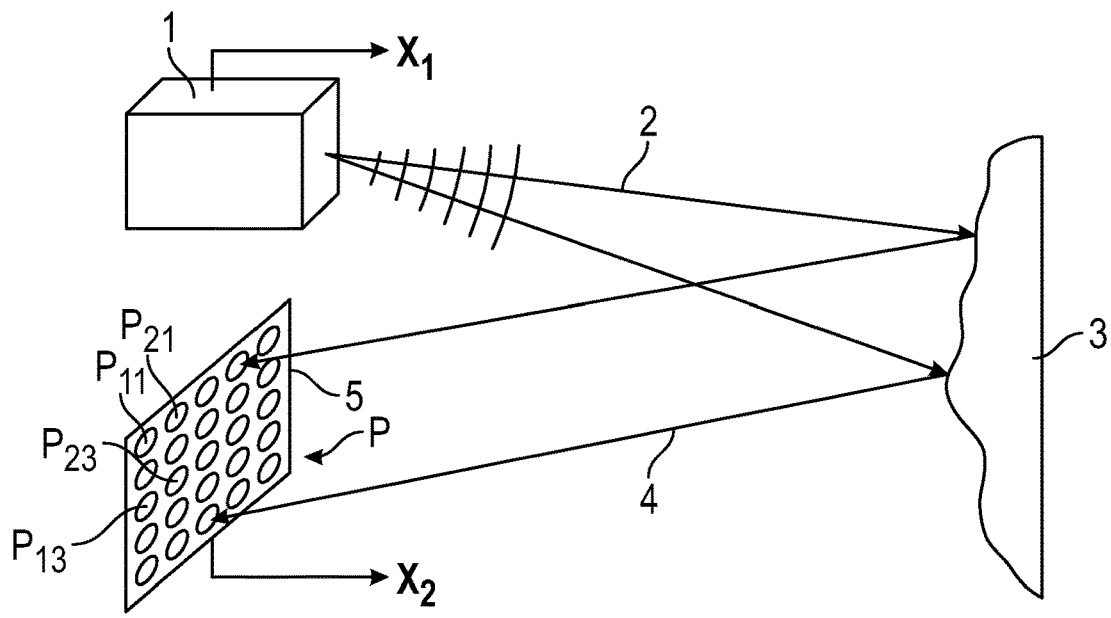

As shown in FIG. 1, a physical signal 2 is transmitted by the transmitter 1. It is reflected at an object 3 and creates reflections 4.

The reflections 4 are received by a sensor matrix 5. The sensor matrix 5 has a plurality of pixels, some of which are designated as $P_{11}$, $P_{13}$, $P_{21}$, and $P_{23}$, for example. These pixels each include a sensor. An image of the object 3 can, for example, be generated in accordance with the position of the pixels $P_{11}$, $P_{13}$, $P_{21}$, and $P_{23}$ in the sensor matrix 5, with the runtime of the emitted physical signal 2, and with the received reflection 4 in the individual pixels $P_{11}$, $P_{13}$, $P_{21}$, and $P_{23}$.

The emitted signal 2 is generated as a pulse in this respect. Consequently, a pulse-like reflection 4 is produced.

Figure 2:
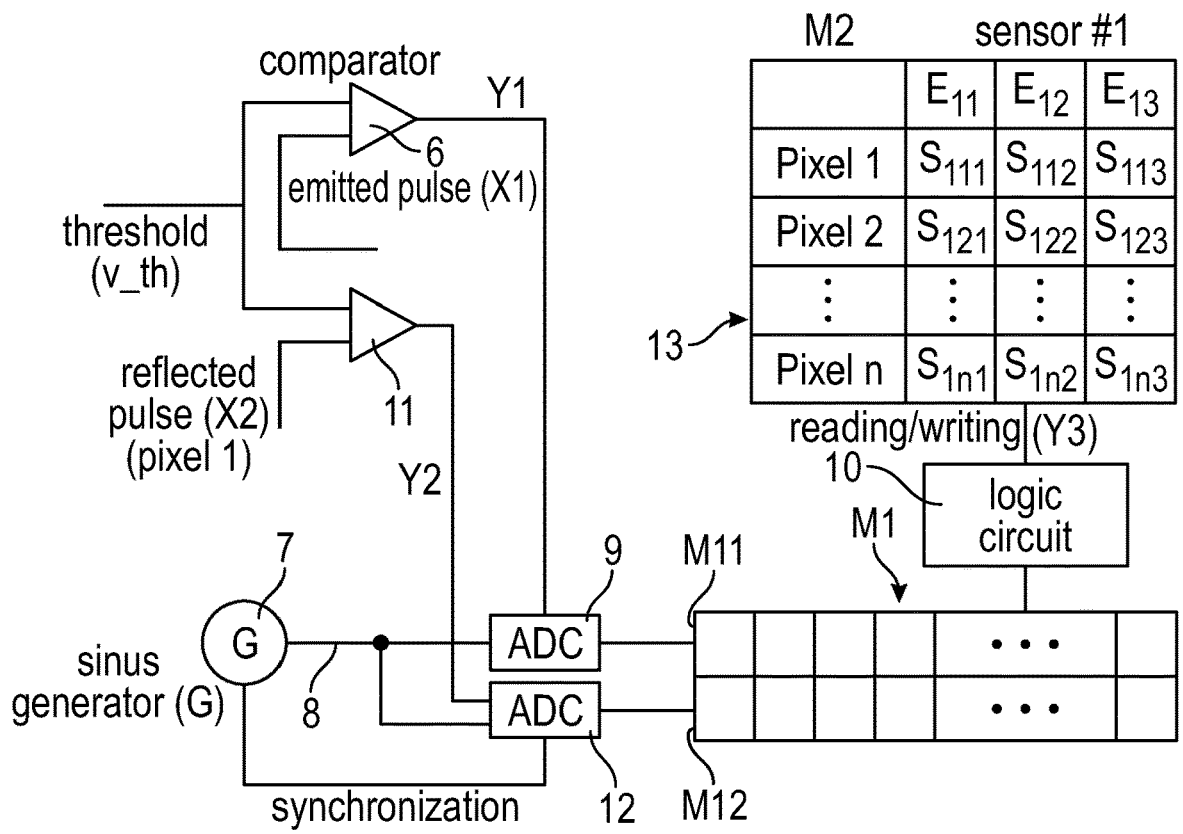
FIG. 2 a schematic diagram of the arrangement in accordance with the invention.

The emitted pulse is given as the size X1 to the arrangement in accordance with the invention in accordance with FIG. 2. In the same way, the reflections 4 of the individual pixels $P_{11}$, $P_{13}$, $P_{21}$, and $P_{23}$ are given as values X2 to the arrangement in accordance with the invention in accordance with FIG. 2.

Figure 5:
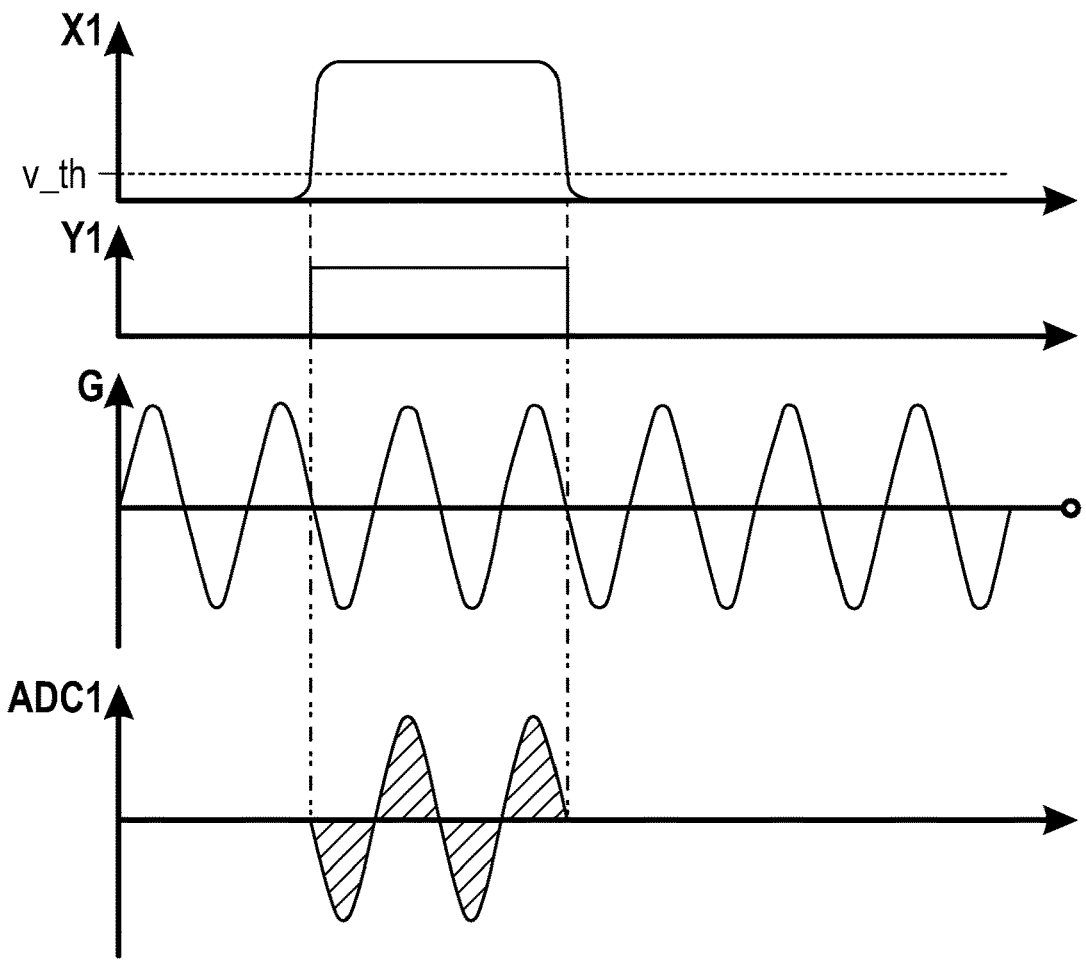
FIG. 5 a signal diagram of the arrangement in accordance with the invention.
Figure 5:
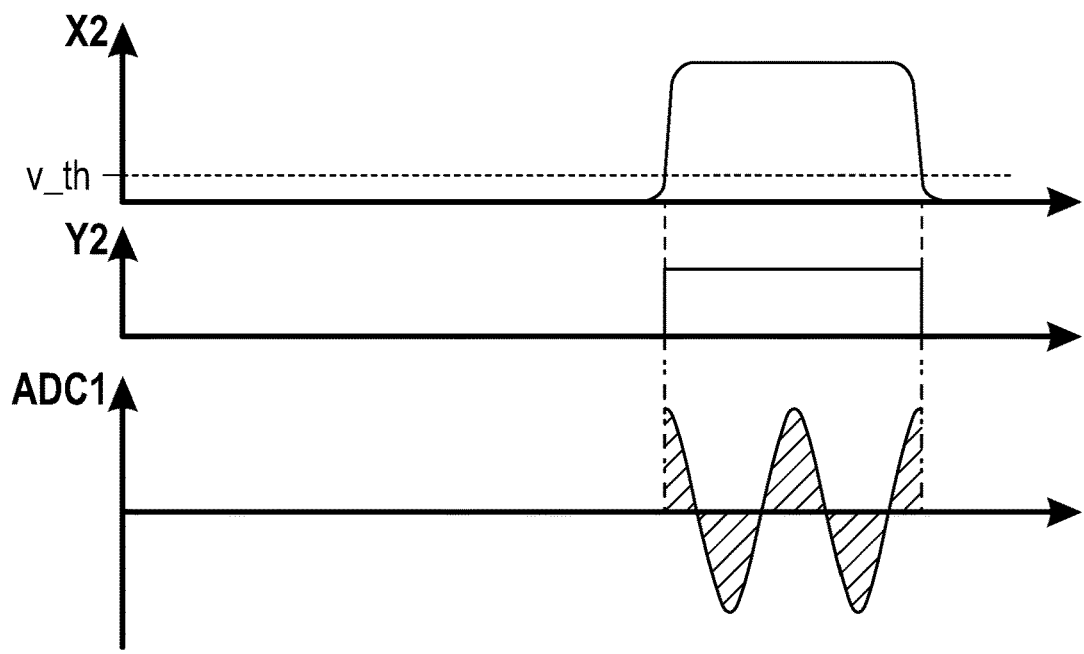
Figure 6:
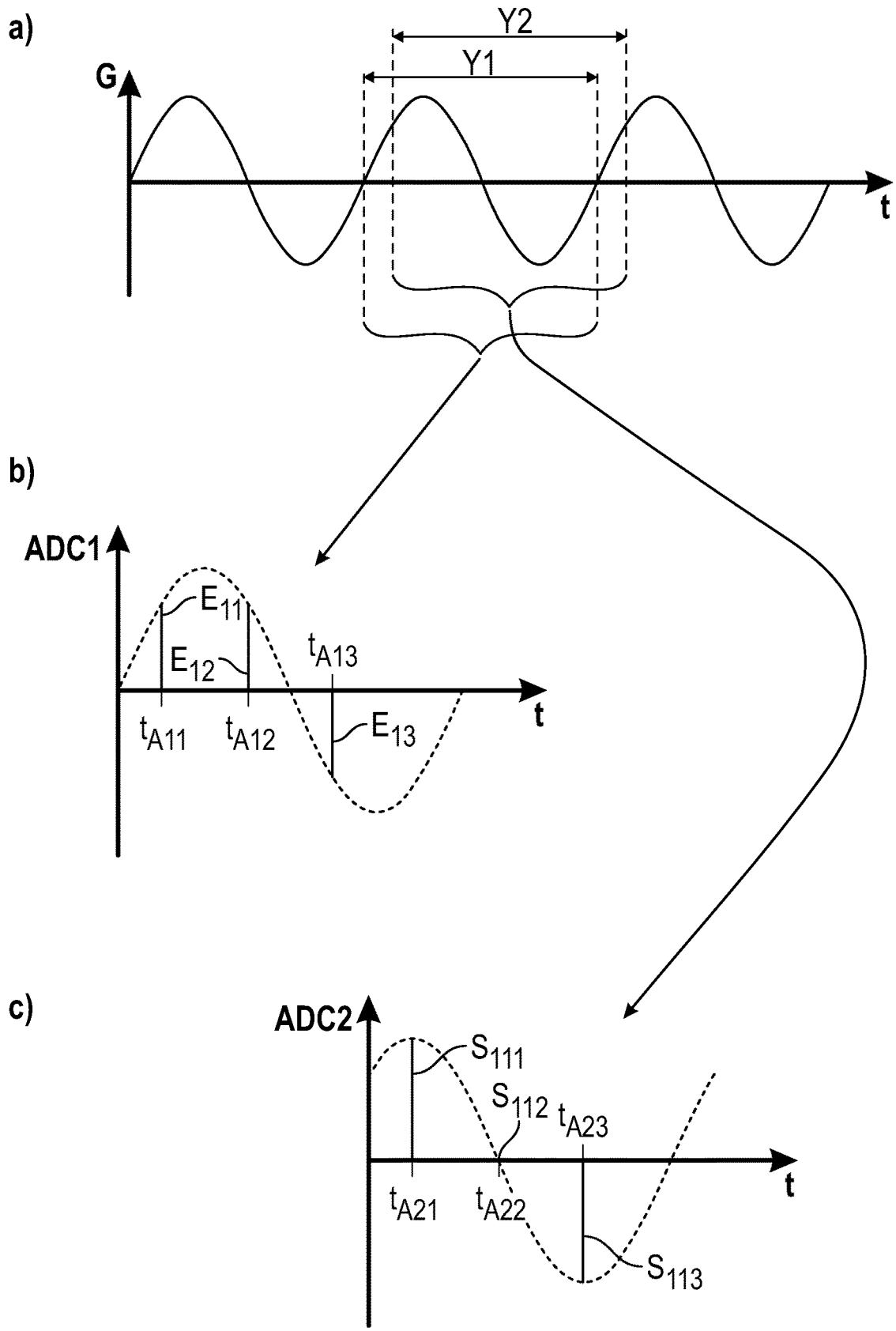
FIG. 6 a representation of the determination of the sampled values.

Since the pulses of the physical signal 2 and the pulses of the reflection 4 do not usually present an ideal pulse behavior, they are compared with a threshold value v_th. For this purpose, X1 is fed to a first comparator 6. Its output Y1, for example, shows a logic 1 as long as the pulse of the emitted physical signal 2 exceeds the threshold value v_th. During this time, a modulation signal 8 generated by a generator 7 is sampled by a first analog-to-digital converter (ADC) 9, as is shown in FIG. 5. In this respect, the sampled values $E_{11}$, $E_{12}$, and $E_{13}$ are generated as shown in FIG. 6. The frequency f of the modulation signal 8 of the generator 7 and the sampling frequency of the ADC 1 are in this respect coordinated or synchronized with one another such that the sampled values are always generated at the same points in time tA11, tA12, and tA13 at least within one period of the modulation signal 8 (see FIG. 6 b).

A sinusoidal modulation signal 8 is shown in the embodiment. It must be noted at this point that the invention is not limited thereto. Rather, other signal forms, such as a sawtooth signal, are also possible. However, the condition is that it must be a periodic signal.

The value pattern is stored in a first part M11 of the memory M1.

The same procedure is used for the reflection 4. In a second comparator 11, the reflection is compared with a threshold value v_th. For this purpose, X2 is fed to a first comparator 6. Its output Y2, for example, shows a logic 1 as long as the received reflection 4 exceeds the threshold value v_th. A modulation signal 8 generated by a generator 7 is sampled by a second analog-to-digital converter (ADC) 12 during this time, as is shown in FIG. 5. In this respect, the sampled values $S_{111}$, $S_{112}$, and $S_{113}$ are generated as shown in FIG. 6. The frequency f of the modulation signal of the generator 7 and the sampling frequency of the ADC 2 are in this respect coordinated or synchronized with one another such that the sampled values are always generated at the same points in time $t_{A21}$, $t_{A22}$, and $t_{A23}$ at least within one period of the modulation signal 8 (see FIG. 6 c).

It is possible that the sampling points in time of the ADC1 or of the ADC2 are not exactly synchronous to the pulse of the emitted or received pulse since the oscillator of the ADC1 or of the ADC2 requires a certain oscillation time ($T_{osc}$) before it runs in a stable manner. However, this time delay ($T_{osc}$) is compensated since the time difference, and not absolute points in time, between the emitted pulse and the received pulse is calculated, as will be explained further below.

The value pattern is stored in a second part M12 of the memory M1. In this respect, the first value pattern in the first part M11 and the second value pattern in the second part M12 each have the same format.

Figure 8:
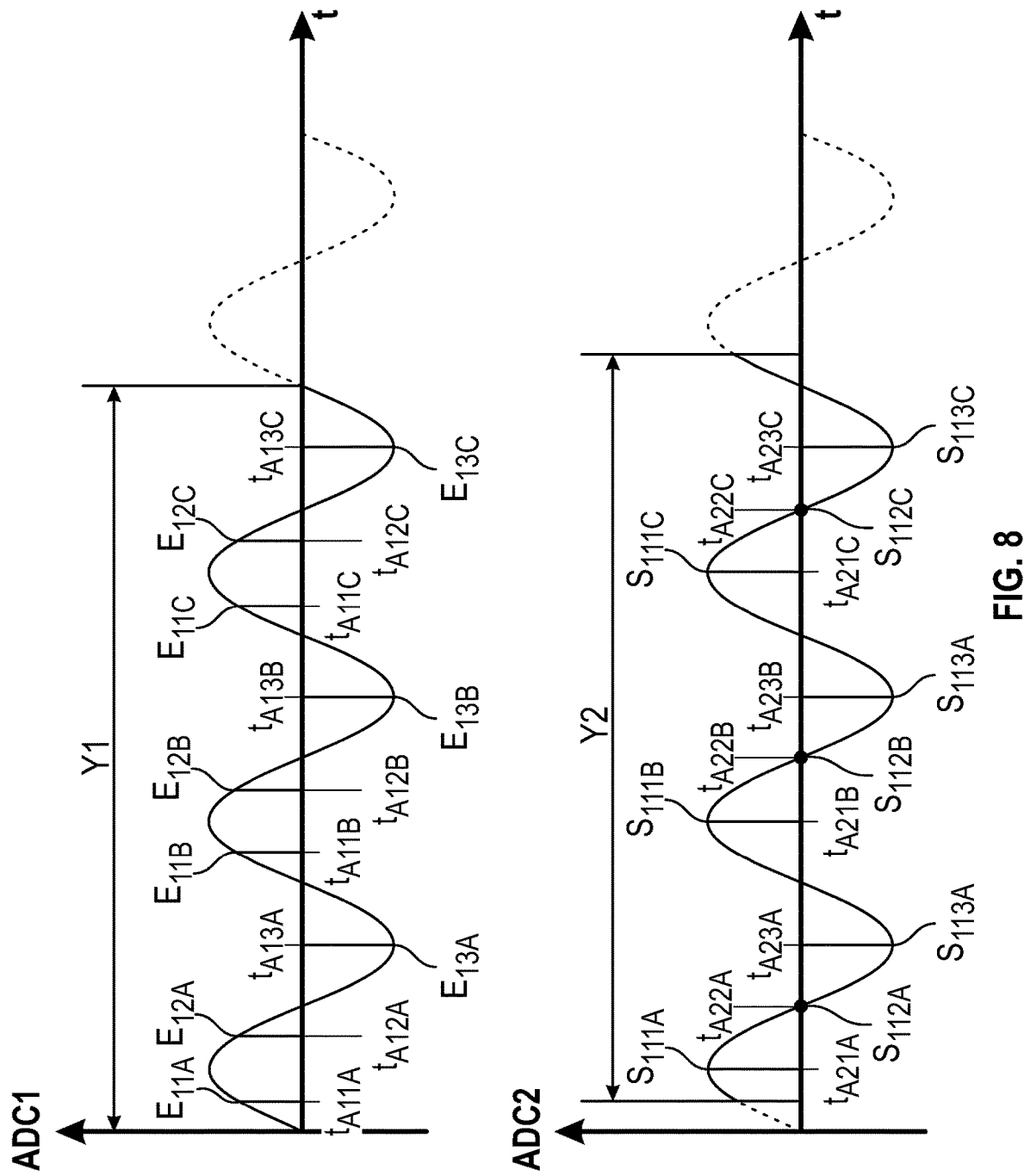
FIG. 8 a representation of the generation of sampled values from average values of a plurality of measurements.

As shown in FIG. 8, there is the possibility that these sampled values $E_{11}$, $E_{12}$, and $E_{13}$ are sampled in a plurality of periods, for example three periods, at, for example, three respective corresponding points in time $t_{A11A}$, $t_{A11B}$, $t_{A11C}$, $t_{A12A}$, $t_{A12B}$, $t_{A12C}$, $t_{A13A}$, $t_{A13B}$ and $t_{A13C}$ and are generated as mean values in accordance with the example by $$E_{11} = \frac{E_{11A} + E_{11B} + E_{11C}}{3}.$$

This takes place via the logic circuit 10. It transfers the values $E_{11}$, $E_{12}$, and $E_{13}$ to a second memory M2.

The same takes place for the sampled values of the reflections 4. These sampled values $S_{111}$, $S_{112}$, and $S_{113}$ are likewise sampled in a plurality of periods, for example three periods, at, for example, three respective corresponding points in time $t_{A21A}$, $t_{A21B}$, $t_{A21C}$, $t_{A22A}$, $t_{A22B}$, $t_{A22C}$, $t_{A23A}$, $t_{A23B}$, and $t_{A23C}$ and are generated as mean values in accordance with the example by $$S_{111} = \frac{S_{111A} + S_{111B} + S_{111C}}{3}.$$

This likewise takes place via the logic circuit 10. It transfers the values $S_{111}$, $S_{112}$, and $S_{113}$ to the second memory M2.

Figure 7:
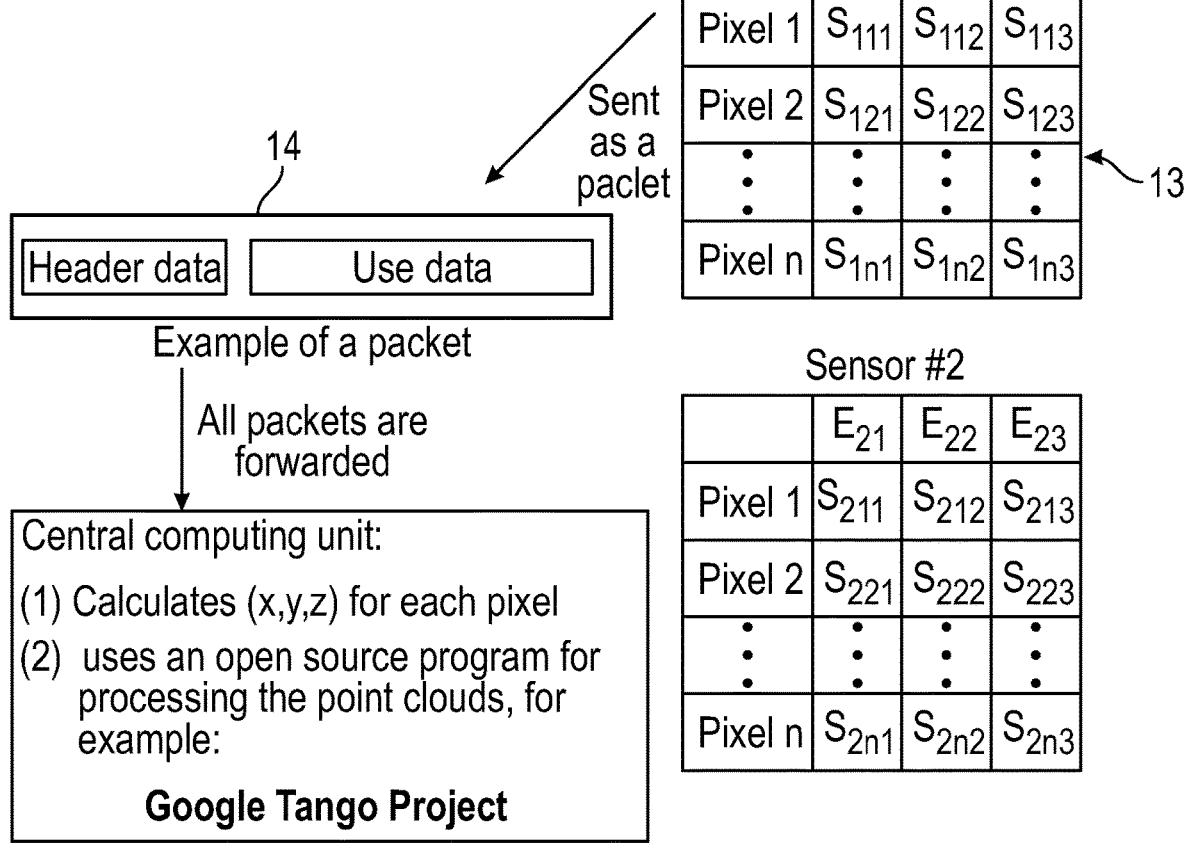
FIG. 7 a representation of the storage of the sampled value patterns.

As shown in FIG. 7, the data transmission takes place with the aid of message packets 14. A packet 14 comprises header data and use data. The header data can include control information. This control information could e.g. include the number of the sensor as the origin of the message, the destination of the message, the length of the message, the sequence number of the message, a checksum of the message, etc.

Figure 3:
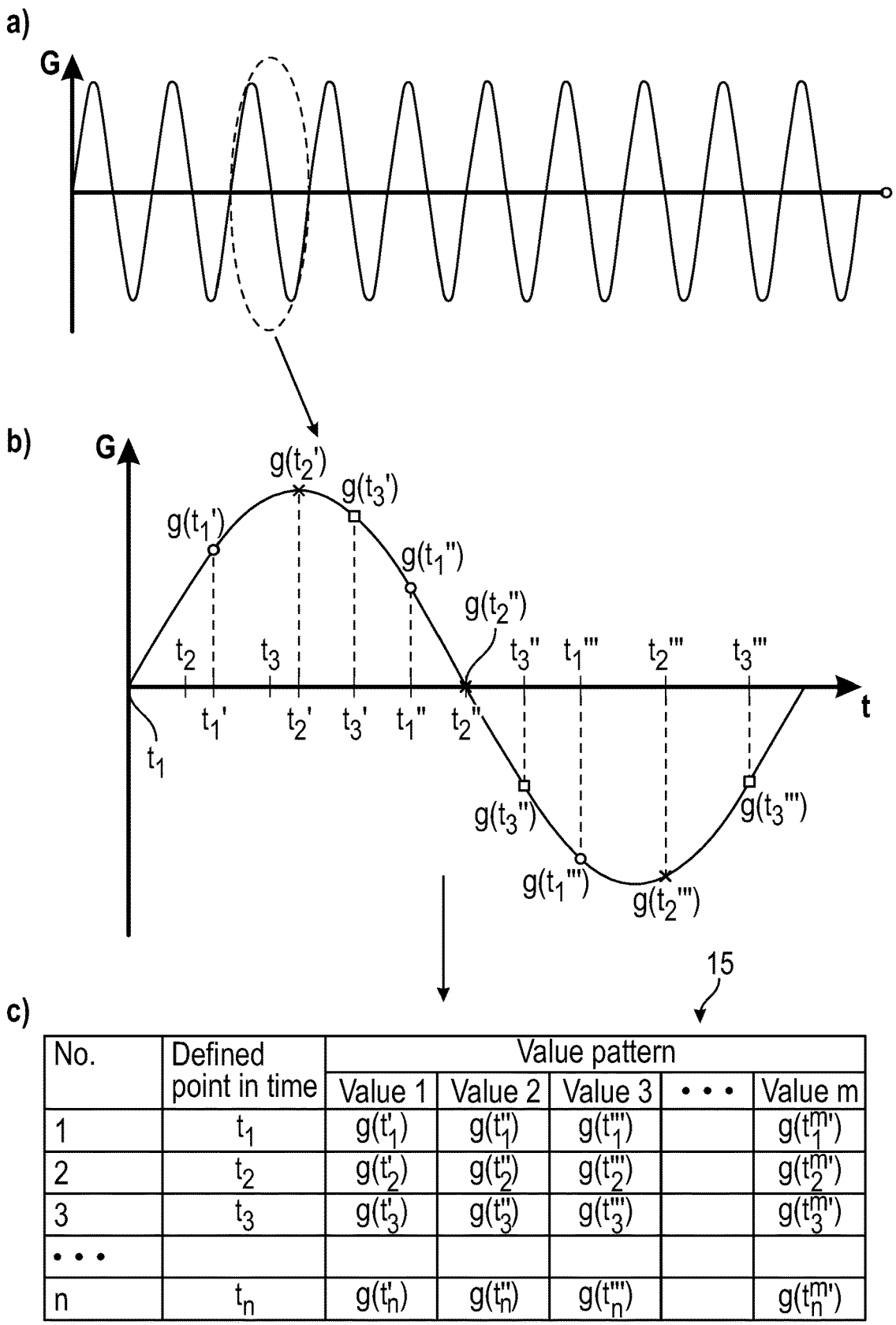
FIG. 3 a representation of the creation of a look-up table on the basis of a time stamp.
Figure 4:
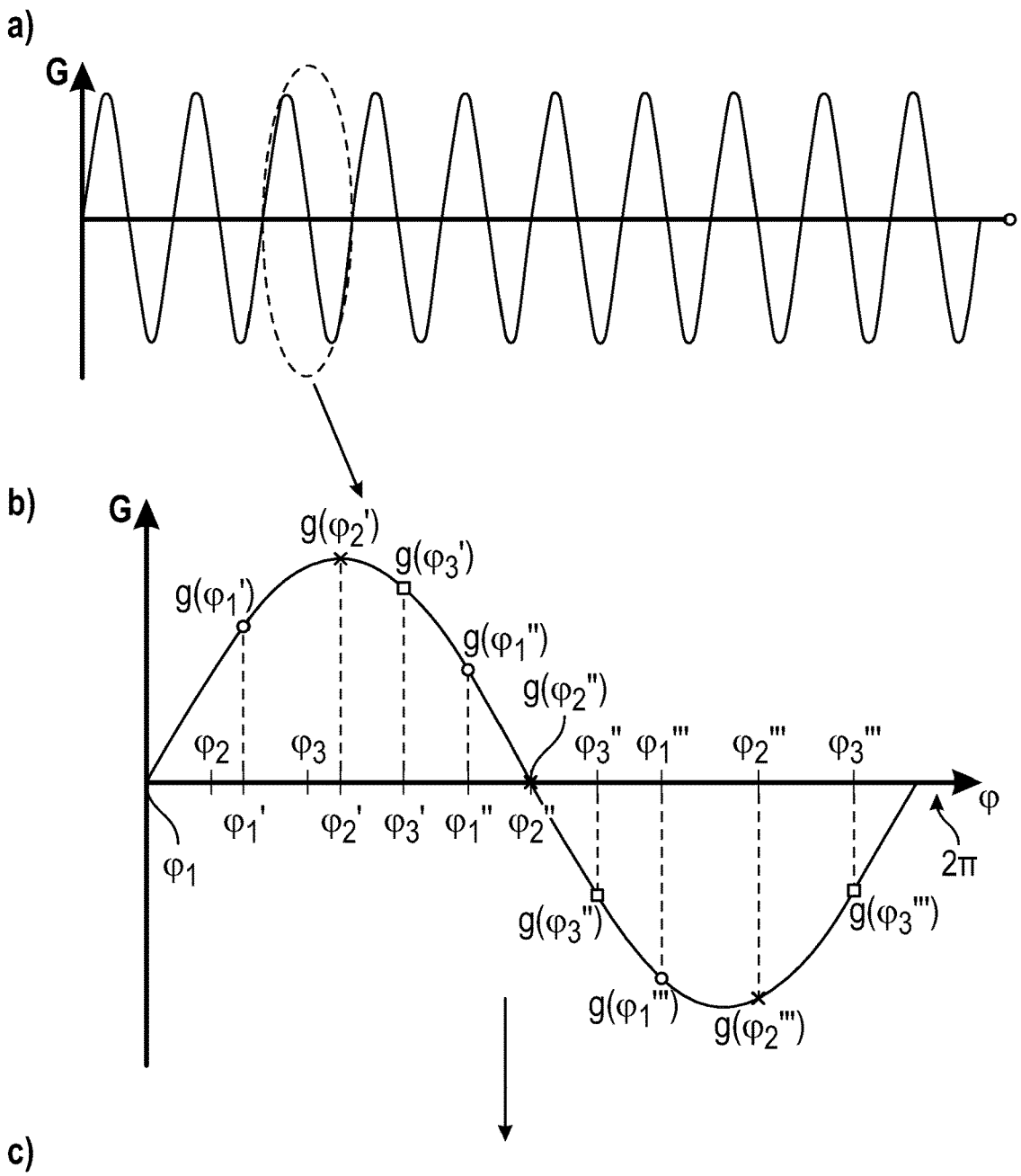
FIG. 4 a representation of the creation of a look-up table on the basis of a phase position.

To determine the runtime, a comparison of the time occurrence or of the position in the phase of the modulation signal of the second value pattern $S_{111}$, $S_{112}$, and $S_{113}$ relative to the first value pattern $E_{11}$, $E_{12}$, and $E_{13}$ is performed. This is implemented in that, as shown in FIG. 3 or FIG. 4, a look-up table 15 is created at the start of the application of the method and is stored in an internal memory. It can remain unchanged over a plurality of applications of the method.

The look-up table comprises a plurality of stored value patterns of the modulation signal that are stored in accordance with their phase position within the period of the modulation signal. For this purpose, a digital image of a period duration of the modulation signal 4 is stored in the format of the first value pattern $E_{11}$, $E_{12}$, and $E_{13}$ and of the second value pattern $S_{111}$, $S_{112}$, and $S_{113}$ in a look-up table 15. The phase position-specific value patterns can either be generated by an initial sampling of the modulation signal 8 or by a calculation.

For this purpose, a first time stamp is e.g. stored which comprises three sampled values of a period of the modulation signal 8 $g(t_1')$, $g(t_1'')$, and $g(t_1''')$ at the sampling times $t_1'$, $t_1''$, and $t_1'''$ and with which the point in time $t_1$ is associated; a second time stamp is stored which comprises three sampled values of a period of the modulation signal 8 $g(t_2')$, $g(t_2'')$, and $g(t_2''')$ at the sampling times $t_2'$, $t_2''$, and $t_2'''$ and with which the point in time $t_2$ is associated; and a third time stamp is stored which comprises three sampled values of a period of the modulation signal 8 $g(t_3')$, $g(t_3'')$, and $g(t_3''')$ at the sampling times $t_3'$, $t_3''$, and $t_3'''$ and with which the point in time $t_3$ is associated.

In the same way, a digital image can be stored on the basis of the phase position, as shown in FIG. 4.

The look-up table 15 can e.g. be designed based on phase distances between the sampled values on the basis of the following equation:

$$\Delta \varphi = 2\pi \times f \times \Delta x,$$

where $\Delta x$ is the resolution of a common time reference and f is the frequency of the modulation signal. Here, the resolution of the analog-to-digital converter (ADC) used plays a key role in clearly associating the sampled values with a phase shift.

In this respect, it should also be noted that the prices of AD converters depend more on the sampling rate than on the resolution. For example, research has shown that the prices for AD converters from the supplier "Analog Devices" increase by approximately 25% when the sampling frequency is doubled with the same resolution. Furthermore, the AD converters need clocks to work. It applies here: The price of the clocks approximately double when the frequency of the clocks is doubled. This approximation is valid up to 2 GHz. Furthermore, semiconductor surface is saved if the sampling frequency is lower, which makes the proposed sensors more compact and cheaper.

If the frequency of the modulation signal is f=5 MHz and a sampling frequency of 15 MHz is selected and the ADC resolution amounts to 14 bits per sample, a time resolution of approximately 10 ps (picoseconds) is achieved.

Furthermore, optimal technology has to be applied in the silicon production phase to minimize the space requirements and the power loss of the ADC.

Typically, a resolution of the time reference can be the greater, the more entries the look-up table 15 has.

Figure 9:
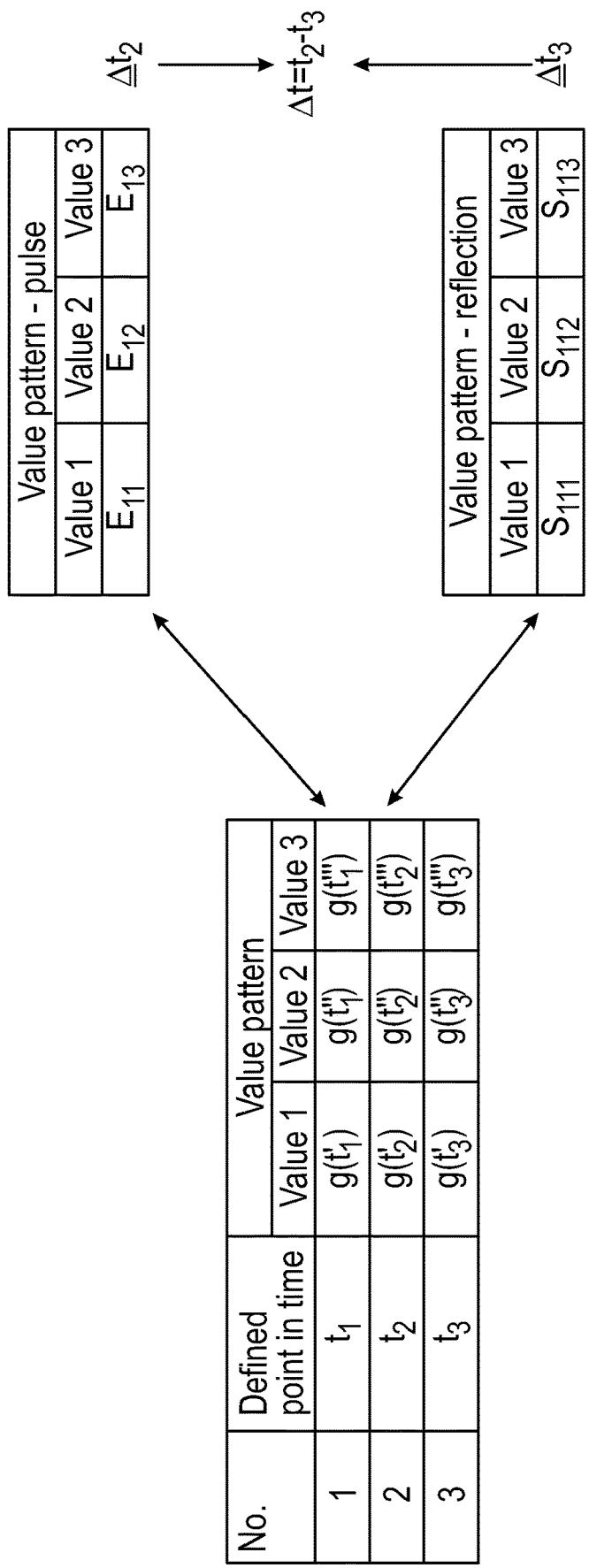
FIG. 9 a representation of the determination of a runtime.

As shown in FIG. 9, a comparison of the first value pattern $E_{11}$, $E_{12}$, and $E_{13}$ with the digital image takes place to determine the runtime. In this respect, in agreement with FIG. 6b), the phase position $t_2$ of the first value pattern $E_{11}$, $E_{12}$, and $E_{13}$ in the digital image, i.e. in the look-up table 15, is determined.

The phase position $t_3$ of the second value $S_{111}$, $S_{112}$, and $S_{113}$ is determined from a further comparison of the second value pattern $S_{111}$, $S_{112}$, and $S_{113}$ with the digital image, i.e. with the look-up table 15.

The phase difference is determined directly from the difference of the first phase position $t_2$ and the second phase position $t_3$. When using the phase-related look-up table in accordance with FIG. 4, the phase difference can be determined and, as is known, the runtime can be determined therefrom.

The method has so far been described with reference to the treatment of the reflection of a pixel, for example, $P_{11}$ in FIG. 1. As shown in FIG. 2 and FIG. 7, the memory matrix 13 provides even further rows for the value patterns of further pixels, for example, $P_{13}$, $P_{21}$, and $P_{23}$. The method is carried out in the same way for these pixels and the value patterns are written into the memory matrix 13 in the corresponding rows and read out from said memory matrix 13 for comparison with the look-up table, as shown above.

As further shown in FIG. 7, the method can also be applied for further sensor matrices that are not shown in more detail, but correspond to the sensor matrix 5.

The index of the sampled values S of the modulation signal 8 during the received reflection 4 is defined as $S_{\#sensor\ matrix,\ \#sensor,\ \#sampling}$.

Figure 10:
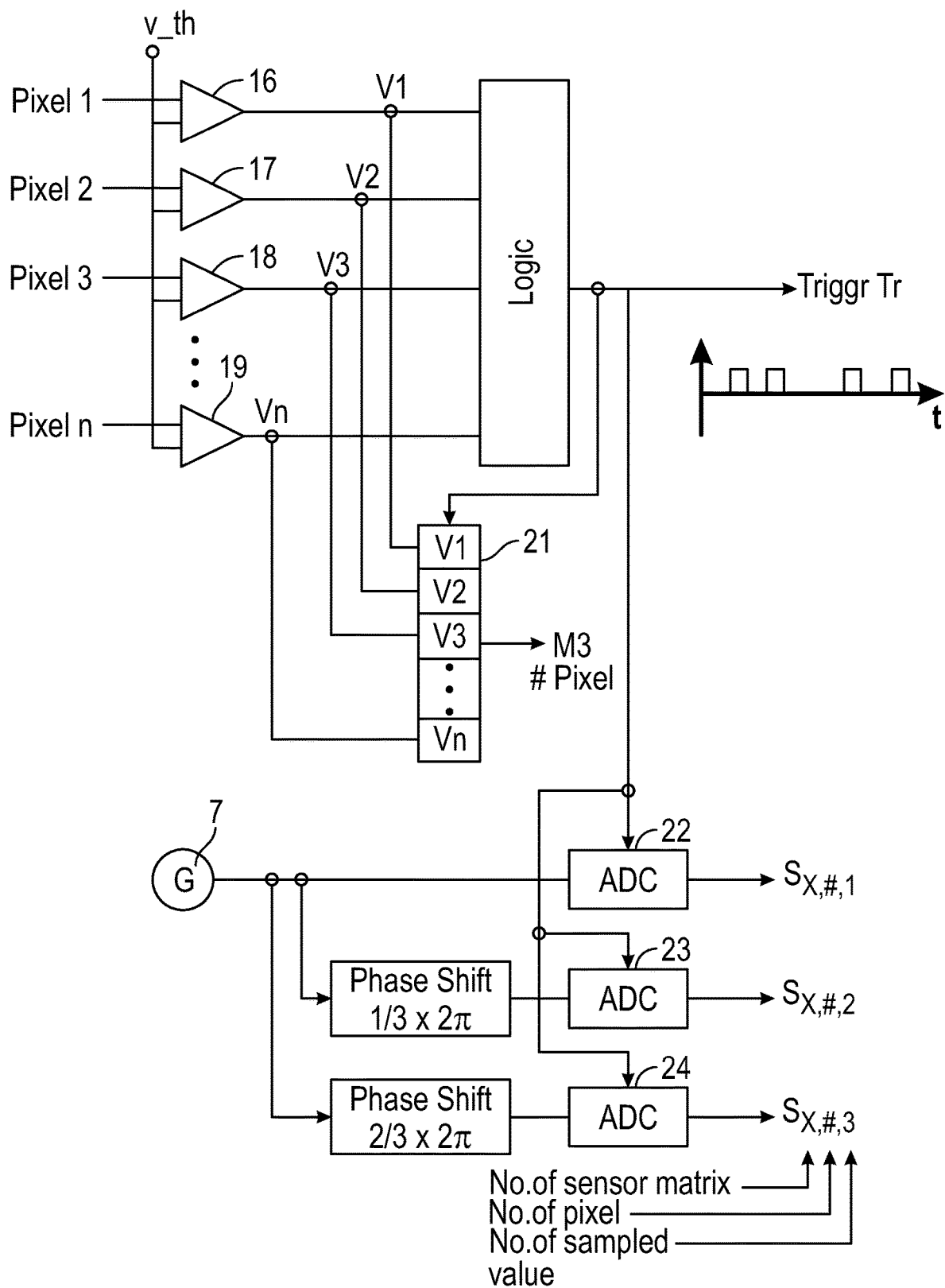
FIG. 10 a representation of an arrangement for generating value patterns for a plurality of pixels.

In an arrangement in accordance with FIG. 1, a respective ADC 12 is required for each pixel P. FIG. 10 now shows a solution for how only three ADCs are required for the generation of second value patterns $S_{111}$, $S_{112}$, and $S_{113}$, $S_{121}$, $S_{122}$ and $S_{123}$, . . . $S_{1n1}$, $S_{1n2}$, and $S_{1n3}$ having, for example, three sampled values for a plurality of pixels P of a sensor matrix 5. As many ADCs as sampled values are always desired in this solution. The number of ADCs is therefore dependent on the intended resolution and not on the number of pixels P.

The reflection which each pixel 1 . . . n receives is fed to a respective comparator 16 to 19 in the manner of the second comparator 11 and compared in it with a threshold value v_th. When the threshold value v_th is exceeded, the outputs V1 . . . Vn each show a logical 1. A logic 20 then generates a trigger Tr each time one of the outputs shows a logic 1 (OR link).

The outputs V1 . . . Vn are furthermore fed to a 1×n-bit memory 21. The results of all the outputs V1 . . . Vn are stored in it and this number is given as a pixel number to the memory matrix 13 to define the pixel to which the subsequently described value pattern $S_{111}$, $S_{112}$, and $S_{113}$, $S_{121}$, $S_{122}$ and $S_{123}$, ... $S_{1n1}$, $S_{1n2}$, and $S_{1n3}$ belongs.

As soon as a trigger signal Tr is applied to the ADCs 22, 23, and 24, they sample the modulation signal 8 generated by the generator 7 and thus generate a second value pattern $S_{x\#1}$, $S_{x\#2}$, $S_{x\#3}$ that belongs to the pixel having the pixel number # stored in the memory 21 and that is then stored for the corresponding row in the memory matrix 13.

The determination of the runtime can then take place in the manner already presented with respect to FIG. 9 by a comparison with the look-up table 14.

The use of only 3 ADCs indeed means that one has to wait until the measurement of the next pixel before the ADC is ready for the next conversion again. For this purpose, this pixel can wait in a delay loop that is not shown in more detail. The delay time is then subtracted from the runtime. To shorten the waiting time, a plurality of ADC stages (instead of 3 ADCs) can also be set up (for example, 6, 9, 12, ..., etc.).

The pixels that detected the same distance or a very similar distance are only evaluated once. Here, depending on the electronics performance, it is possible to estimate whether the method could separately evaluate the pixels having very similar distances.

A multi-dimensional phase position of the reflections can be determined via the value patterns stored in the memory matrix 13 for each individual pixel. The runtime of the pulse is determined from the respective differences of the phase positions and a distance dimension for each pixel in the sensor matrix is thus simultaneously determined. A three-dimensional point cloud (x, y, z) results as a model of the environment.

With the aid of further software functions (also open source software), the 3D model of the environment can be prepared such that various functions of a DAS can be implemented. Examples for functions of a DAS that can be implemented with the aid of 3D lidar sensor technology are: a) lane change assistant, b) emergency brake assistant, c) lane keeping assistant, d) adaptive cruise control, and e) autonomous driving.

Further uses of the sensor technology are: autonomous driving, 3D mapping, indoor navigation, gesture recognition in human-machine interfaces (3D gesturing for HMI: human machine interfaces) and in the presence detection in safety and lighting management applications.

A further advantage of the method is its flexibility. For example, a plurality of 3D lidar sensors can e.g. be used to cover a large area. For example, FIG. 4 shows the use of two sensors. Each individual sensor sends the sampled values of the emitted signal and also the sampled values of the signals reflected by the objects for each pixel to a central computing unit (CPU). In other words, the sampled values of the emitted and reflected signals form a contiguous series of signal values with a specific sampling frequency.

The following tasks are to be satisfied with the aid of the CPU:

calculating the coordinates (x, y, z) for each pixel in the sensor with the aid of the method of the invention as described above; and using open source software to create a 3D model of the environment with the aid of the point cloud determined from the sensor data. Different specific applications can, for example, be implemented with the aid of this 3D model:

a) recognition of a door opening for safeguarding a machine control;

b) counting of persons and objects;

c) gesture control (human-machine interface); and d) volumetric association of objects.

The Google Tango project is currently preferred as open source software for the CPU. This software has e.g. been used in Lenovo smartphones since 2016. Within the framework of this invention, Google Tango offers advantages in the implementation of various applications. For example, the software supports the direct communication between the sensor CPU and Android-based smartphones or tablets. Novel and interesting apps for indoor smart sensing can thus be generated on these mobile end devices:

(1) An assisted guidance for humans by Android apps is possible if the actual starting point and the desired destination are known. For example, such a system can guide customers in a large store directly to their targets.

(2) Based on the above-mentioned system description, the implementation of object tracking is also possible. This can then in turn be used for various safety and pathfinding applications.

The design of the sensor system with a CPU furthermore offers many advantages in specific application examples:

In emergency situations in which the evacuation of people is necessary, the CPU can indicate alternative paths on which few people or objects block the way.

The use of a single CPU saves the costs of the calculation circuits that would be required if the method should be calculated in each individual sensor.

There is naturally also the possibility to use the sensors flexibly in battery operation.

The CPU can additionally also acquire the values of other sensors, e.g. light sensors, smoke sensors, motion sensors, temperature sensors, etc., to make ideal decisions in certain situations.

Furthermore, the acquired sensor data of the lidar sensors can be evaluated offline with the aid of methods from the field of big data analysis to create value matrices for the continuous self-calibration. Correction factors can thus be determined for the calculation of the point clouds to compensate external influences on the measurement results with the aid of additional temperature sensors and light sensors.

It can very generally be stated that the communication between different actuators and/or sensors in conjunction with a central calculation instance directly meets the core idea of the revolution in industrial networking associated with the keyword Industry 4.0.

In summary, it can be stated that there is a requirement for improved techniques for implementing simple, inexpensive, and accurate 3D lidar sensors for indoor smart sensing and applications in the automotive sector. There is in particular a need for techniques that avoid the use of complex circuitry technology or computationally intensive signal processing methods.

The proposed distance measurement system is an accurate and simple apparatus and a method that enable the implementation of inexpensive 3D lidar sensors. The cost advantages compared to the prior art result substantially from the considerably lower computing and circuitry effort that is caused by the invention. The following complex and cost-raising technical components are avoided:

(1) complex phase measurement circuits or very fast clocks, (2) continuous periodic signals in the VHF and UHF frequency ranges, (3) high-bandwidth signals and logic circuits, (4) high sampling rates or oversampling rates, i.e. sampling rates above the Shannon-Nyquist limit, (5) large memory resources, and
(6) complex signal processing methods that can only be implemented on special computers or sophisticated digital signal processors (DSPs). This also means a reduction of the energy consumption.

Furthermore, the invention provides that the method does not directly evaluate the reflected pulses to measure the distance. In this way, the use of very high sampling rates and also the emission of several thousand pulses to improve the signal-to-noise ratio can be avoided. This increases the reliability of the sensors, saves energy, and enables the recording of a plurality of point clouds of the environment in the same time interval.

The flexibility of the presented apparatus allows a plurality of sensors to send the sampled values of the emitted signal and also the sampled values of the reflected signals for each pixel as sent data packets to a central computing unit (CPU) to perform the proposed process centrally. This saves costs and also allows the utilization of other advantages that were already described above.

In another respect, the invention allows a self-calibration of the 3D lidar sensors. In this respect, correction factors are defined for the measured values with respect to measurable external influences. These correction factors are then stored in the memory and are used to ensure the accuracy of the distance measurement system even under changing boundary conditions.

The above-mentioned method explains a digital evaluation of the phase shift between the ADC 9 and the ADC 12. Naturally, an I/Q demodulation known per se, such as is described in "Hochfrequenztechnik Teil 2", ISBN: 3-540-55084-4, 4th edition, pages 541-545, could also, instead of the ADC, serve to determine the phase position of the modulation signal. However, the digital method has the advantage that it is resistant to interference. As already mentioned, the modulation signal is not necessarily sinusoidal.

The application of the I/Q demodulation is thus not precluded. During the production of the corresponding circuit arrangement, a decision is made as to which method is more suitable depending on the power consumption, interference immunity, and accuracy.

Arrangement and Method for Runtime Measurement of a Signal Between Two Events

REFERENCE NUMERAL LIST

1 transmitter
2 physical signal, pulse
3 object
4 reflection
5 sensor matrix
P pixel, general
$P_{11}$ pixel
$P_{13}$ pixel
$P_{13}$ pixel
$P_{23}$ pixel
v_th threshold value
6 first comparator
Y1 output of the first comparator
7 generator
8 modulation signal
9 first analog-to-digital converter (ADC)
E sampled values of the modulation signal during the pulse of the emitted physical signal
E11 first sampled value of the modulation signal during the pulse of the emitted physical signal
E12 second sampled value of the modulation signal during the pulse of the emitted physical signal
E13 third sampled value of the modulation signal during the pulse of the emitted physical signal
$t_{411}$, $t_{412}$, $t_{413}$ sampling point in time of the modulation signal during the pulse transmission
M1 first memory
M11 first part of the memory M1
S sampled values of the modulation signal during the received reflection
S111 first sampled value of the modulation signal during the received reflection
S112 second sampled value of the modulation signal during the received reflection
S113 third sampled value of the modulation signal during the received reflection
$t_{421}$, $t_{422}$, $t_{423}$ sampling point in time of the modulation signal during the received reflection
M12 second part of the memory M1
10 logic circuit
M2 second memory
11 second comparator
Y2 output of the second comparator
12 second ADC
13 memory matrix
14 data packet
15 look-up table
16 comparator
17 comparator
18 comparator
19 comparator
V1 comparator output
V2 comparator output
V3 comparator output
Vn comparator output
20 logic
Tr trigger
21 1×n-bit memory
22 ADC
23 ADC
24 ADC

The invention claimed is:
1. A method for a runtime measurement of a signal between two events, in which method a comparison of one of a time occurrence and a position in a phase of a reference signal on the occurrence of a first event and on the occurrence of the second event is determined, wherein a periodically repeating reference signal is generated by a generator and one of its phase position and time stamp is determined as a first signature for the occurrence of the signal in the first event, the phase position and the time stamp of the reference signal respectively being determined as a second signature for the occurrence of the signal in the second event, and the runtime being determined as a difference of one of the phase positions and the time stamps of the first and second signatures, wherein a physical signal is transmitted by a transmitter, the physical signal is reflected at an object, and generates reflections,
wherein
the reflections are received by a sensor matrix that has a plurality of pixels, each having a sensor and a pixel number;

a trigger signal is generated by a logic from a reflection, which each pixel receives, when a threshold value is exceeded in order to determine the second signature; and wherein the pixel numbers of the pixels generating a trigger signal are stored in a memory matrix; and the second signature is determined by the trigger signal and is stored in the memory matrix for all the stored pixel numbers.

2. A method for a runtime measurement of a signal between two events, in which method a comparison of one of a time occurrence and a position in a phase of a reference signal on the occurrence of a first event and on the occurrence of the second event is determined, wherein a periodically repeating reference signal is generated by a generator and one of its phase position and time stamp is determined as a first signature for the occurrence of the signal in the first event, the phase position and the time stamp of the reference signal respectively being determined as a second signature for the occurrence of the signal in the second event, and the runtime being determined as a difference of one of the phase positions and the time stamps of the first and second signatures, wherein a physical signal is transmitted by a transmitter, the physical signal is reflected at an object, and generates reflections, wherein the reflections are received by a sensor matrix that has a plurality of pixels, each having a sensor and a pixel number; and a trigger signal is generated by a logic from a reflection, which each pixel receives, when a threshold value is exceeded in order to determine the second signature, wherein, to determine the runtime, a look-up table is created on the basis of one of a phase position and a time stamp and is stored in an internal memory.

3. The method in accordance with claim 2, wherein the difference of one of the phase positions and the time stamps of the first and second signatures are determined by a comparison with values stored in the look-up table.

4. The method in accordance with claim 2, wherein the look-up table comprises a plurality of stored value patterns of the reference signal that are stored in accordance with their time-specific or angle-specific phase within the period of the reference signal.

5. The method in accordance with claim 4, wherein the look-up table is created and stored at the start of the application of the method and remains unchanged over a plurality of applications of the method.

6. The method in accordance with claim 1, wherein a single periodically repeating reference signal having a frequency f is generated.

7. A method for a runtime measurement of a signal between two events, in which method a comparison of one of a time occurrence and a position in a phase of a reference signal on the occurrence of a first event and on the occurrence of the second event is determined, wherein a periodically repeating reference signal is generated by a generator and one of its phase position and time stamp is determined as a first signature for the occurrence of the signal in the first event, the phase position and the time stamp of the reference signal respectively being determined as a second signature for the occurrence of the signal in the second event, and the runtime being determined as a difference of one of the phase positions and the time stamps of the first and second signatures, wherein a physical signal is transmitted by a transmitter, the physical signal is reflected at an object, and generates reflections, wherein the reflections are received by a sensor matrix that has a plurality of pixels, each having a sensor and a pixel number;

a trigger signal is generated by a logic from a reflection, which each pixel receives, when a threshold value is exceeded in order to determine the second signature, and wherein, when the trigger signal is applied, an ADC samples the reference signal and determines the second signature.

8. The method in accordance with claim 7, wherein a delay loop is provided to bridge the time until the ADC is ready for the next conversion again.

9. The method in accordance with claim 1, wherein the first event is the transmission of a pulse of the physical signal; and wherein the second event is the reception of a reflection.

10. An apparatus configured for carrying out a method for a runtime measurement of a signal between two events, the apparatus comprising a generator, a transmitter, sensor matrix and a logic, in which method a comparison of one of a time occurrence and a position in a phase of a reference signal on the occurrence of a first event and on the occurrence of the second event is determined, wherein a periodically repeating reference signal is generated by the generator and one of its phase position and time stamp is determined as a first signature for the occurrence of the signal in the first event, the phase position and the time stamp of the reference signal respectively being determined as a second signature for the occurrence of the signal in the second event, and the runtime being determined as a difference of one of the phase positions and the time stamps of the first and second signatures, wherein a physical signal is transmitted by the transmitter, the physical signal is reflected at an object, and generates reflections, wherein the reflections are received by the sensor matrix that has a plurality of pixels, each having a sensor and a pixel number; and a trigger signal is generated by the logic from a reflection, which each pixel receives, when a threshold value is exceeded in order to determine the second signature, the pixel numbers of the pixels generating a trigger signal are stored in a memory matrix; and the second signature is determined by the trigger signal and is stored in the memory matrix for all the stored pixel numbers.

* * * * *